United States Patent
Hu et al.

(10) Patent No.: US 11,144,097 B1
(45) Date of Patent: Oct. 12, 2021

(54) ALL-IN-ONE COMPUTER

(71) Applicants: Zung-Ting Hu, Taipei (TW); Wen-Hsien Chin, Taipei (TW); Hsuan-Liang Lin, Taipei (TW); Yen-Kang Chen, Taipei (TW); Jia-Wen Chen, Taipei (TW); Cheng-Min Chen, Taipei (TW); Tze-Chiang Cheng, Taipei (TW)

(72) Inventors: Zung-Ting Hu, Taipei (TW); Wen-Hsien Chin, Taipei (TW); Hsuan-Liang Lin, Taipei (TW); Yen-Kang Chen, Taipei (TW); Jia-Wen Chen, Taipei (TW); Cheng-Min Chen, Taipei (TW); Tze-Chiang Cheng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/898,443

(22) Filed: Jun. 11, 2020

(30) Foreign Application Priority Data

Mar. 24, 2020 (TW) .................................. 109109783

(51) Int. Cl.
*G06F 1/16* (2006.01)

(52) U.S. Cl.
CPC .......... *G06F 1/1654* (2013.01); *G06F 1/1632* (2013.01); *G06F 1/1669* (2013.01);
(Continued)

(58) Field of Classification Search
CPC .... G06F 1/1654; G06F 1/1632; G06F 1/1637; G06F 1/1669; G06F 1/1683
See application file for complete search history.

(56) References Cited

U.S. PATENT DOCUMENTS

| | | | |
|---|---|---|---|
| 8,462,494 B2 * | 6/2013 | Chen | F16M 13/00 361/679.41 |
| 9,261,911 B2 * | 2/2016 | Lin | G06F 1/1626 |

(Continued)

FOREIGN PATENT DOCUMENTS

| | | |
|---|---|---|
| CN | 105867559 | 8/2016 |
| TW | 201436672 | 9/2014 |
| TW | M561243 | 6/2018 |

OTHER PUBLICATIONS

"Office Action of Taiwan Counterpart Application", dated May 19, 2021, p. 1-p. 5.

*Primary Examiner* — Nidhi Thaker
(74) *Attorney, Agent, or Firm* — JCIPRNET

(57) ABSTRACT

An all-in-one computer including a main body and an electronic assembly is provided. The main body includes a first casing part and a second casing part. The second casing part is movably connected to the first casing part and configured to move between a first position and a second position in relative to the first casing part, and the first casing part has an engaging portion and an electrical connection portion. The electronic assembly is disposed in the second casing part. When the second casing part is located at the first position, the second casing part is engaged with the engaging portion and the electronic assembly is connected to the electrical connection portion, and when the second casing part is located at the second position, the second casing part is departed from the engaging portion and the electronic assembly is departed from the electrical connection portion.

9 Claims, 15 Drawing Sheets

(52) U.S. Cl.
CPC .......... *G06F 1/1683* (2013.01); *G06F 1/1615* (2013.01); *G06F 1/1658* (2013.01)

(56) References Cited

U.S. PATENT DOCUMENTS

| | | | |
|---|---|---|---|
| 10,860,068 B2* | 12/2020 | Brocklesby | G06F 1/1677 |
| 2011/0222238 A1* | 9/2011 | Staats | G06F 1/1616 |
| | | | 361/679.55 |
| 2013/0314300 A1* | 11/2013 | Moscovitch | F16M 11/14 |
| | | | 345/1.3 |
| 2016/0294113 A1* | 10/2016 | Mehandjiysky | H01R 13/6205 |
| 2017/0090516 A1* | 3/2017 | Ku | G06F 1/1669 |
| 2017/0227986 A1* | 8/2017 | Ent | F16M 11/08 |

\* cited by examiner

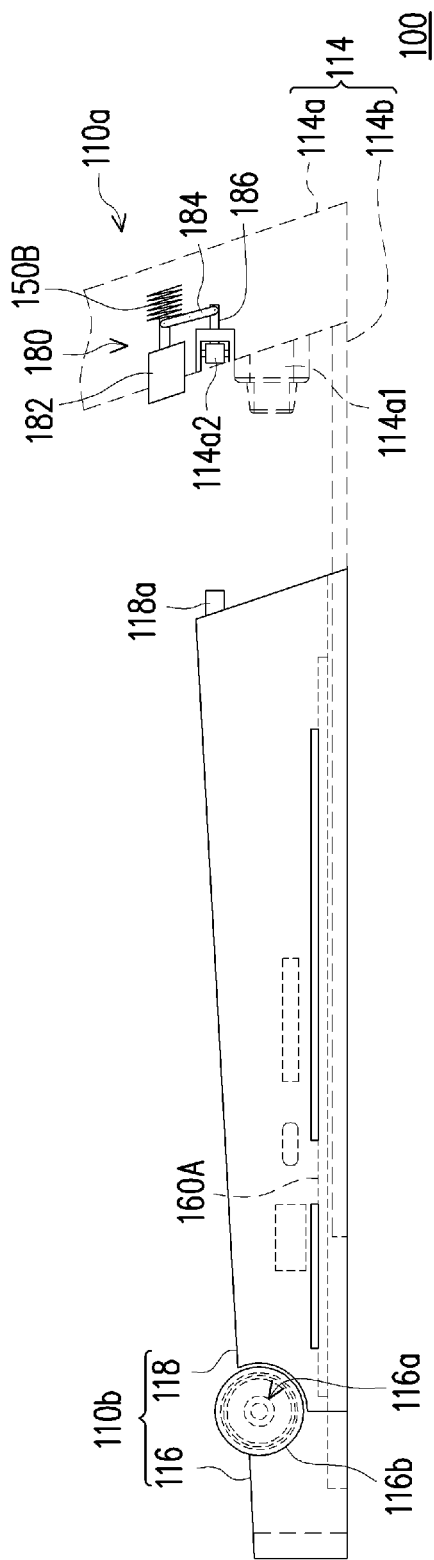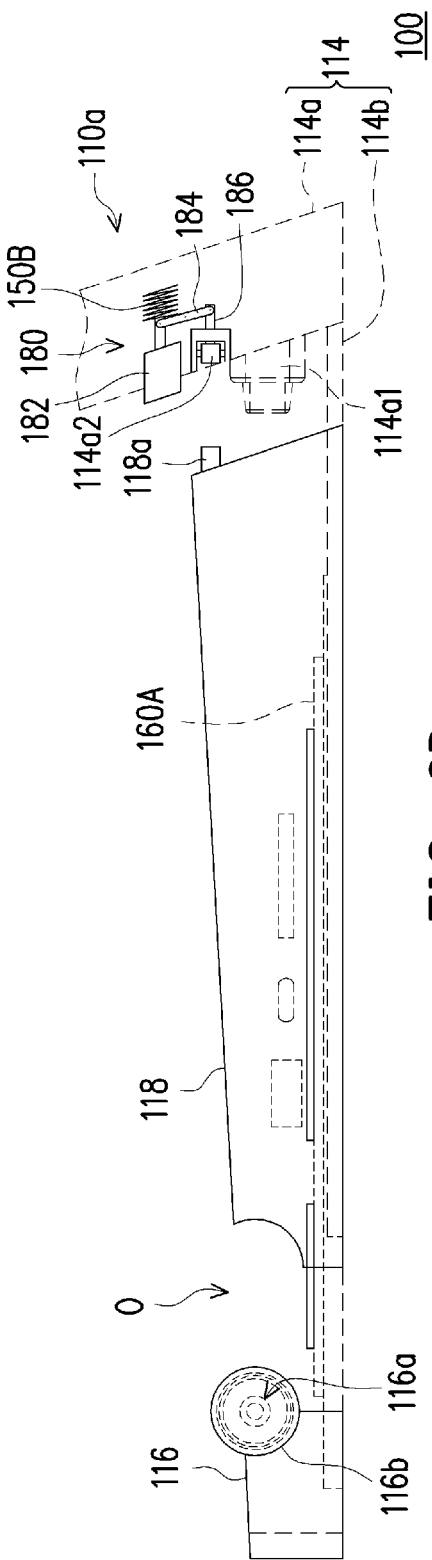
FIG. 6C
FIG. 6D

ALL-IN-ONE COMPUTER

CROSS-REFERENCE TO RELATED APPLICATION

This application claims the priority benefit of Taiwan application serial no. 109109783, filed on Mar. 24, 2020. The entirety of the above-mentioned patent application is hereby incorporated by reference herein and made a part of this specification.

BACKGROUND

Technical Field

The present invention relates to an electronic device, and particularly to an All-In-One (AIO) computer.

Description of Related Art

The traditional desktop computer comprises the display and the host separated from each other, and the display and the host are electrically connected through cables, which takes up a lot of space and is not compact. As a result, an All-In-One (AIO) computer that integrates the host into the display is proposed, which not only reduces the space occupied, but also makes the appearance more compact. Most of the electronic assemblies, such as the motherboard, are set up in the main casing behind the display, which requires disassembling the display and the main casing to reveal the motherboard, making the expansion or maintenance of the electronic assembly inconvenient.

SUMMARY

The present invention provides an AIO computer, in which the electronic assembly is readily expandable or maintainable.

The AIO computer of the present invention includes a main body and an electronic assembly. The main body includes a first casing part and a second casing part. The second casing part is movably connected to the first casing part and is configured to move between a first position and a second position in relative to the first casing part. The first casing part has an engaging portion and an electrical connection portion. The electronic assembly is arranged in the second casing part. When the second casing part is in the first position, the second casing part is engaged with the engaging portion and the electronic assembly is connected to the electrical connection portion. When the second casing part is in the second position, the second casing part is departed from the engaging portion, and the electronic assembly is departed from the electrical connection portion.

In an embodiment of the present application, the electronic assembly is a motherboard.

In an embodiment of the present application, the main body comprises a main casing, a base and a stand, and the stand is connected between the base and the main casing to support the main casing on the base. The first casing part includes the main casing and the stand, the engaging portion and the electrical connection portion are located on the stand, and the second casing part is the base.

In an embodiment of the present application, the second casing part is configured to move in a first direction and be departed from the first casing part, and the second casing part is configured to be engaged with the engaging portion along a second direction opposite to the first direction. The electronic assembly is configured to be connected to the electrical connection portion along the second direction.

In an embodiment of the present application, the second casing part is configured to move in a first direction and be departed from the first casing part, the second casing part comprises a first sub-casing part and a second sub-casing part, the second sub-casing part is located between the first sub-casing part and the first casing part. When the second casing part is at the second position, the second sub-casing part is configured to move in a second direction opposite to the first direction in relative to the first sub-casing part, to form an opening area between the first sub-casing part and the second sub-casing part, and the opening area exposes at least a part of the electronic assembly.

In an embodiment of the present application, the second casing part has a protruding part, and the protruding part is configured to be engaged with the engaging portion. The AIO computer further comprises a pushing assembly which is movably disposed at the first casing part and is configured to push the protruding part away from the engaging portion.

In an embodiment of the present application, the pushing assembly comprises a press part, a linkage, and a push part, the linkage is connected between the press part and the push part, and the press part is configured to be pressed and drive the pushing part through the linkage to push the protruding part.

In an embodiment of the present application, the AIO computer further comprises an elastic component, wherein the elastic component is disposed between the pushing assembly and the first casing part. The pushing assembly is configured to push the protruding part in resisting against an elastic force of the elastic component and be reset by the elastic force of the elastic component.

In an embodiment of the present application, the second casing part has at least one slide rail and is slidably arranged on the first casing part through the at least one slide rail.

In an embodiment of the present application, the electronic assembly has a signal and power integration slot, and the electrical connection portion is a signal and power integration connector. When the second casing part is at the first position, the signal and power integration connector is connected to the signal and power integration slot.

Based on the above, in the AIO computer of the present application, the second casing part can be moved to a specific position to disconnect the electronic assembly in the second casing part from the electrical connection portion of the first casing part as long as the engagement between the second casing part and the first casing part is released, and thus the electronic assembly is readily expandable or maintainable.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6A to FIG. 6D are operation flowcharts of the second casing part of FIG. 1.

DESCRIPTION OF THE EMBODIMENTS

Figure 1:
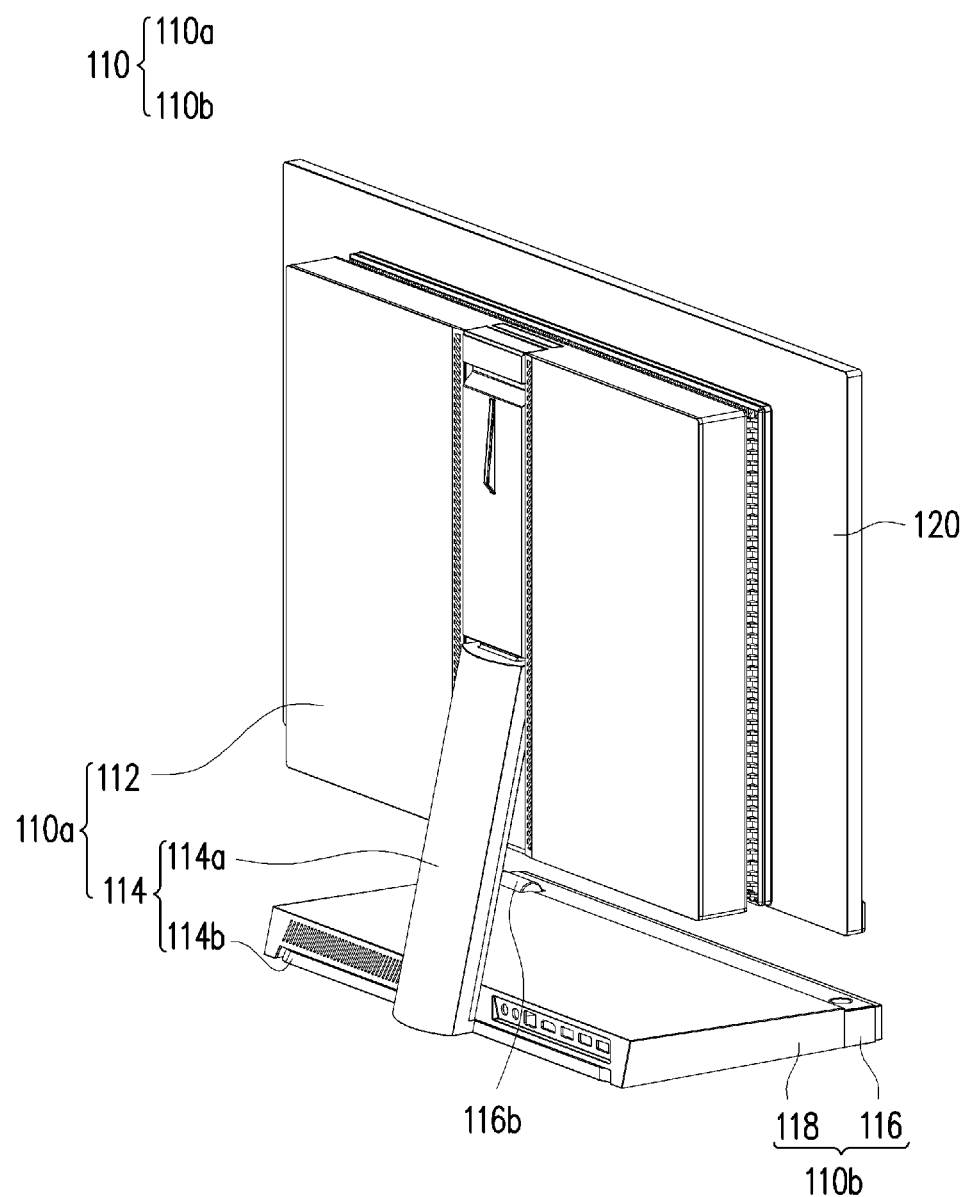
FIG. 1 is a perspective view of an electronic device according to an embodiment of the invention.
Figure 2:
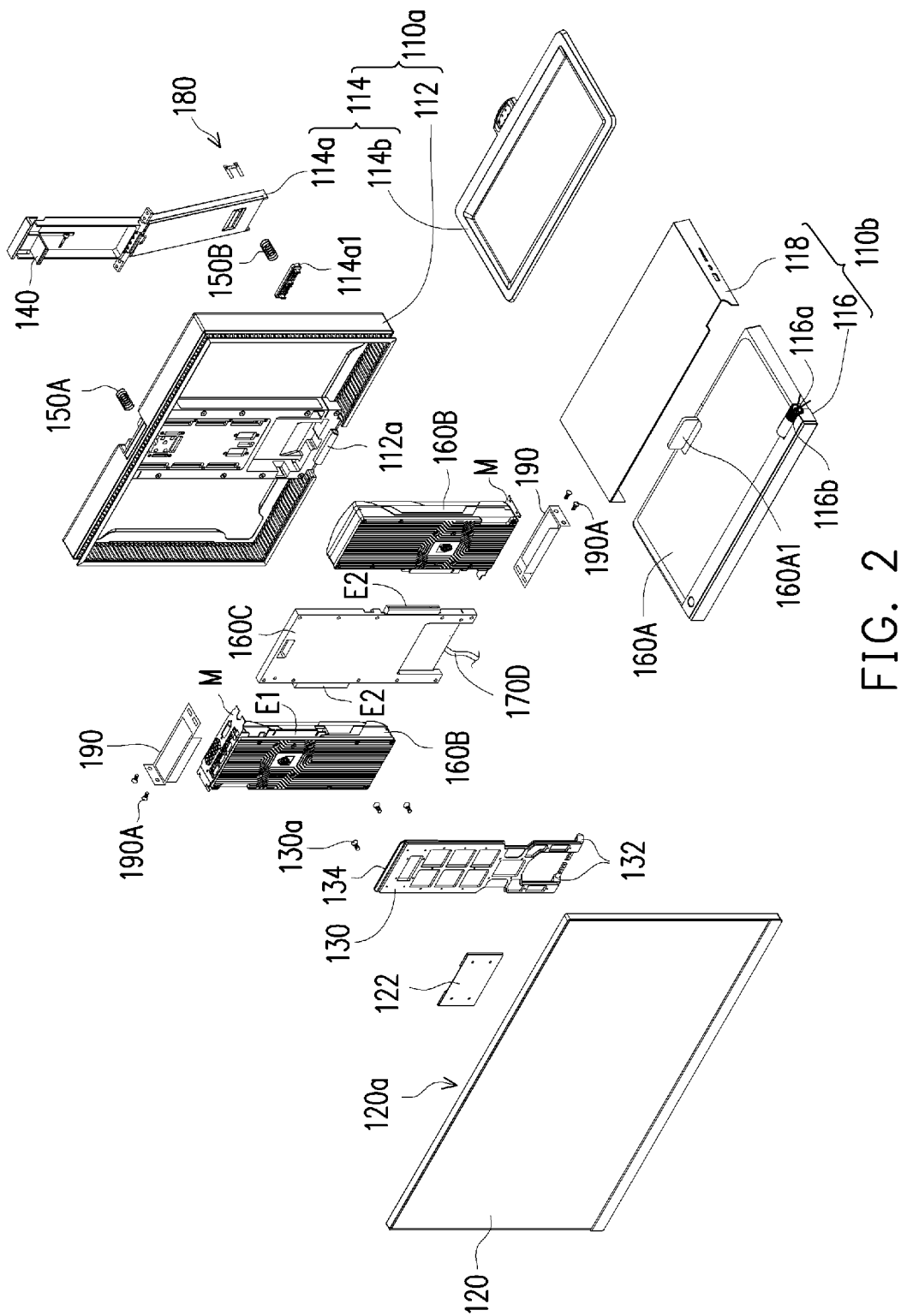
FIG. 2 is an exploded view of the electronic device of FIG. 1.

FIG. 1 is a perspective view of an electronic device according to an embodiment of the application. FIG. 2 is an exploded view of the electronic device of FIG. 1. Referring to FIG. 1 and FIG. 2, the electronic device 100 of this embodiment is, for example, an AIO computer and includes a main body 110 and a display 120. The main body 110 includes a first casing part 110*a* and a second casing part 110*b*, the first casing part 110*a* includes a main casing 112 and a stand 114, and the second casing part 110*b* is a base. The stand 114 includes a based portion 114*b* and an extended portion 114*a* connected to each other. The based portion 114*b* is connected to the second casing part 110*b*, and the extended portion 114*a* extends upward from the based portion 114*b* and connects the main casing 112. That is, the stand 114 is connected between the second casing part 110*b* and the main casing 112 so that the main casing 112 is supported on the second casing part 110*b*. The display 120 is disposed on the main casing 112 of the first casing part 110*a*.

FIG. 3A to FIG. 3F show the disassembly flow of the display of FIG. 1. In the present embodiment, the display 120 is rotatably connected to the main casing 112 along the rotation axis A (marked in FIGS. 3A to 3F). When the display 120 rotates in relative to the main casing 112 to a first state shown in FIG. 3A, the display 120 closes the main casing 112, and when the display 120 rotates in relative to the main casing 112 to a second state shown in FIG. 3D, the display 120 is departed from the main casing 112 so as to be removed from the main casing 112. That is, by rotating the display 120 in relative to the main casing 112 to a specific state (i.e., the second state described above), the display 120 can be readily removed from the main casing 112. By doing so, the convenience of replacing or repairing the display 120 is enhanced, allowing users to easily replace displays with different screen sizes or specifications or send the display 120 for repair as needed.

Figure 3A:
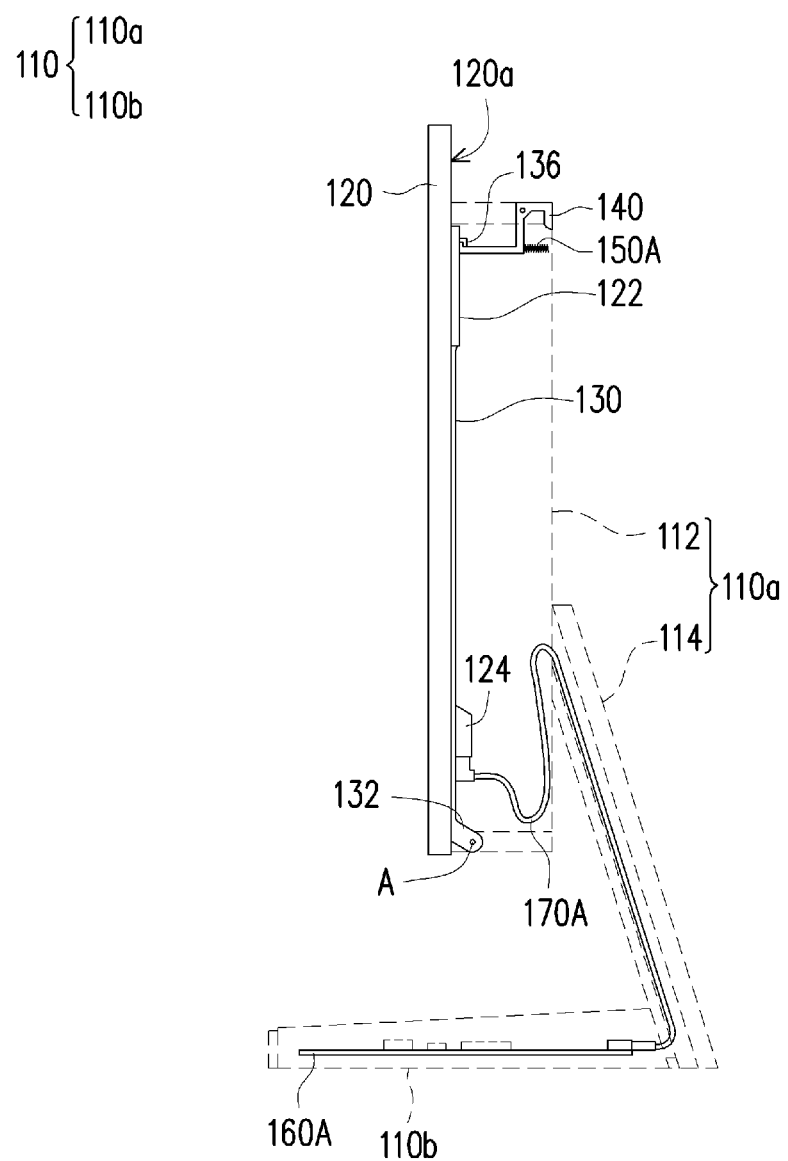
FIG. 3A to FIG. 3F show the disassembly flow of the display of FIG. 1.

In detail, the electronic device 100 of the present embodiment includes a frame 130 as shown in FIGS. 2 and 3A. The display 120 is rotatably connected to the main casing 112 by the frame 130. Specifically, the frame 130 has a pivoting portion 132 pivotally connected to the pivoting portion 112*a* of the main casing 112 along the rotation axis A. The display 120 is detachably mounted to the frame 130 and can be rotated with the frame 130 between the first state and the second state. The display 120 has a first assembly portion 122 on its back surface 120*a*, the frame 130 has a second assembly portion 134, and the first assembly portion 122 and the second assembly portion 134 are detachably assembled with each other by, for example, the fasteners 130*a* (e.g., screws).

In addition, the electronic device 100 includes a locking member 140 and an elastic component 150A. The locking member 140 is pivotally connected to the main casing 112. The elastic component 150A is, for example, a spring and is disposed between the locking member 140 and the main casing 112. The frame 130 has an engaging portion 136 (shown in FIG. 3A to FIG. 3F), which corresponds to the locking member 140. When the display 120 is in the first state shown in FIG. 3A, the locking member 140 is locked to the engaging portion 136 by the elastic force of the elastic component 150A, so as to limit the frame 130 and the display 120 to the first state. In the present embodiment, the locking member 140 and the engaging portion 136 are, for example, in the form of hooks and are suitable for engaging with each other. However, the present application is not limited thereto, and may be other forms of structures suitable for mutual locking.

On the other hand, the electronic device 100 includes an electronic assembly 160A and at least one electrical connection cable (an electrical connection cable 170A is schematically illustrated in FIG. 3A). The display 120 has an electrical connection portion 124 (as shown in FIG. 3A). The electrical connection portion 124 is disposed on the back surface 120*a* of the display 120. The electronic assembly 160A is, for example, a motherboard and is disposed in the second casing part 110*b*, and the electrical connection cable 170A is connected between the electrical connection portion 124 and the electronic assembly 160A. That is, the display 120 is electrically connected to the electronic assembly 160A through the electrical connection portion 124 and the electrical connection cable 170A.

As mentioned above, when the display 120 is in the first state shown in FIG. 3A, the back surface 120*a* of the display 120 and the first assembly portion 122 thereon face the main casing 112, and the first assembly portion 122, the second assembly portion 134, and the fasteners 130*a* are concealed between the display 120 and the main casing 112, to prevent the appearance of the electronic device 100 from being affected by the exposure of the first assembly portion 122, the second assembly portion 134, the fasteners 130*a*, and the electrical connection portion 124, and to prevent the electrical connection cable 170A from unwantedly loosening from the electrical connection portion 124 due to external force.

Figure 3B:
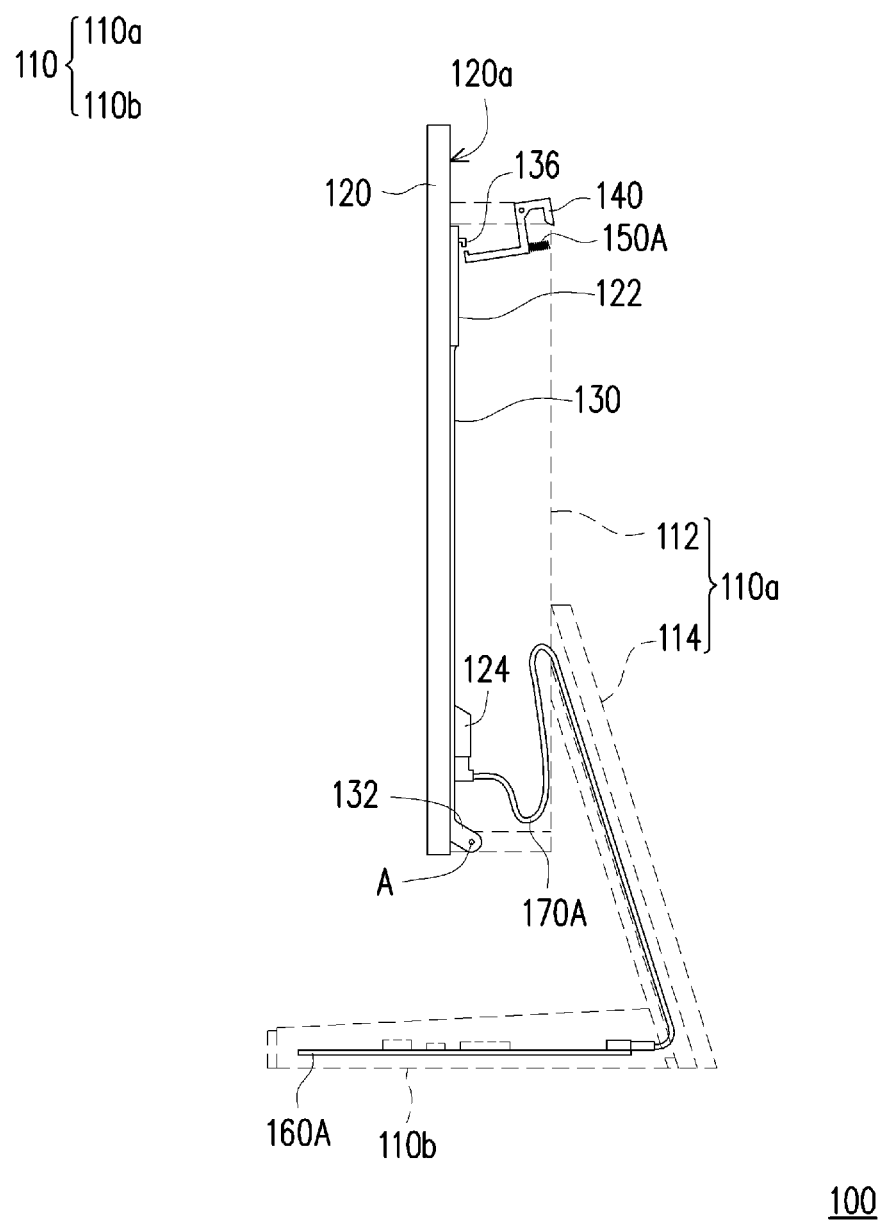
Figure 3C:
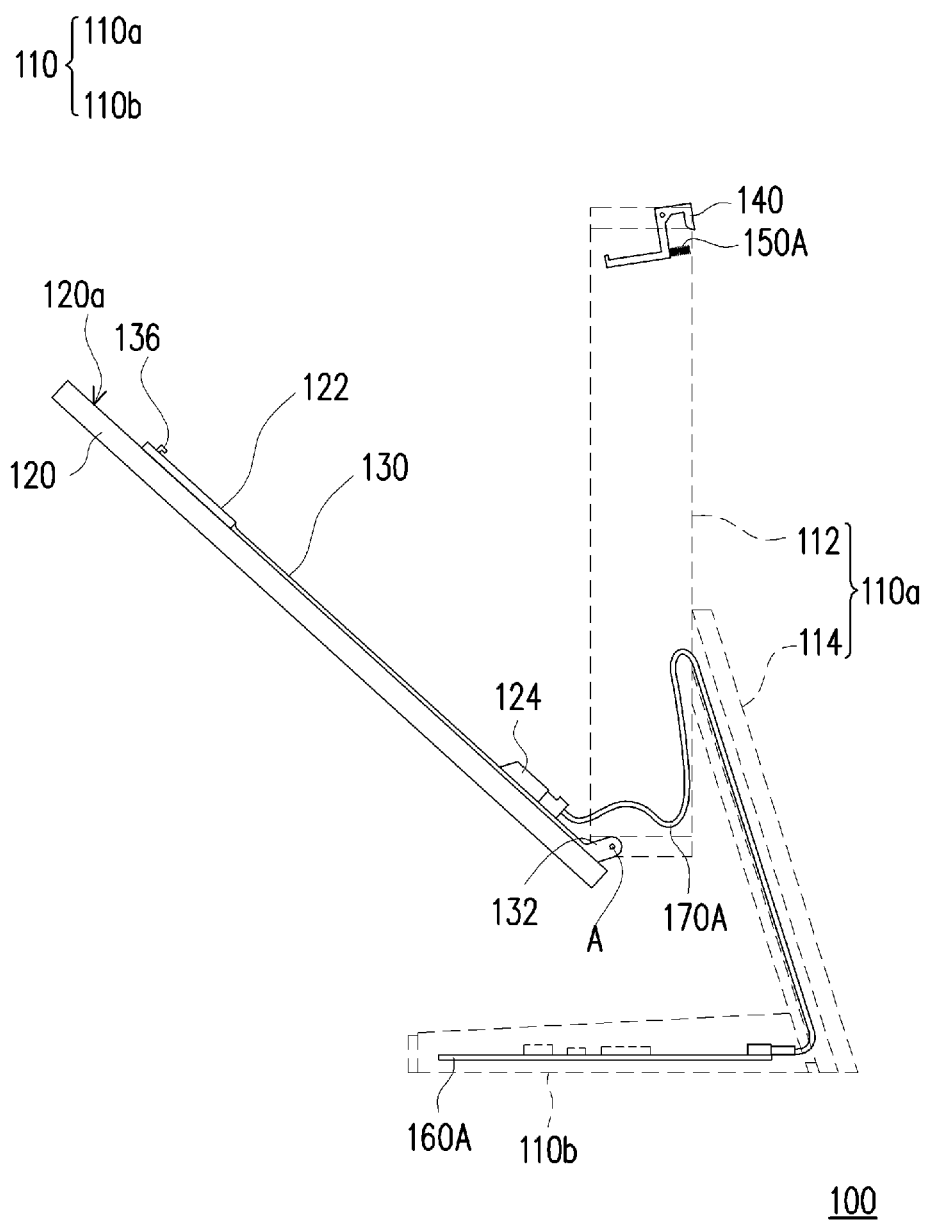
Figure 3D:
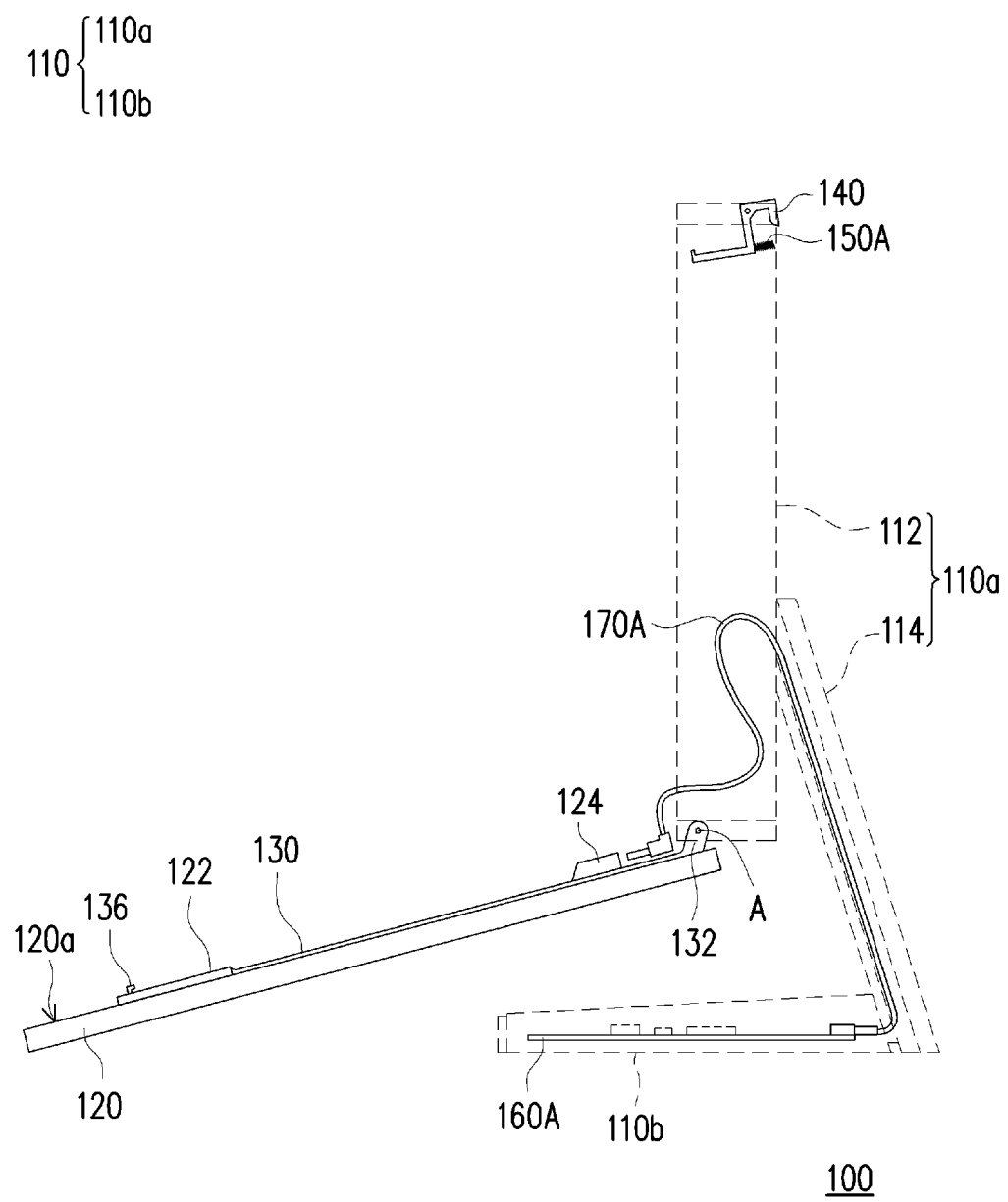
Figure 3E:
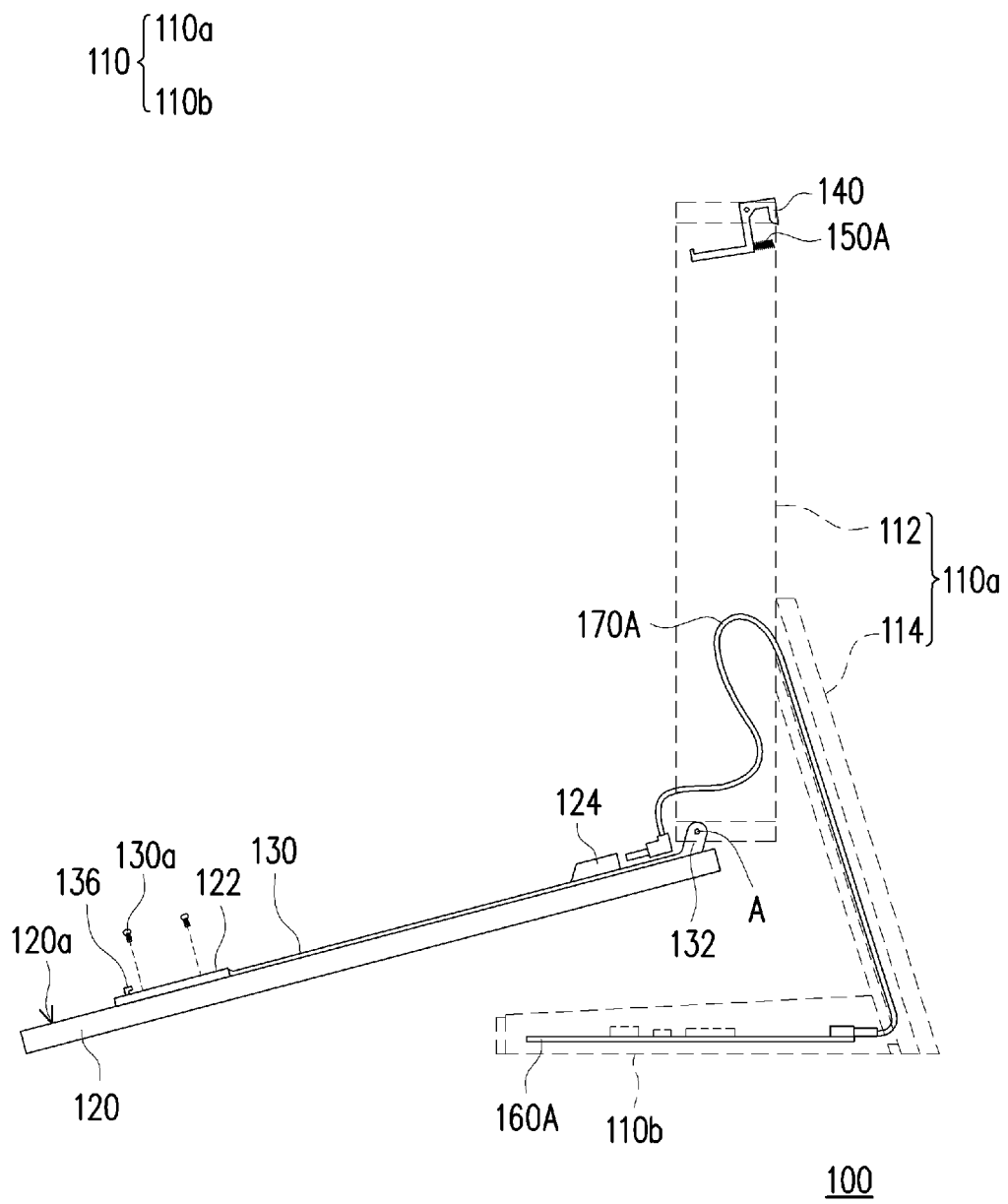

Referring to FIG. 3A to FIG. 3B, when the user wants to detach the display 120, the user can apply force to the locking member 140 to make it resist against the elastic force of the elastic component 150A to rotate in relative to the main casing 112 and disengage from the engaging portion 136. The frame 130 and the display 120 are no longer restricted to the first state. Then, referring to FIG. 3B to FIG. 3D, the user can apply force to rotate the display 120 to the second state and expose the first assembly portion 122, the second assembly portion 134, and the fasteners 130*a* (shown in FIG. 2 and FIG. 3E) and the electrical connection portion 124. After that, the user can unplug the electrical connection cable 170A from the electrical connection portion 124 as shown in FIG. 3D and remove the fasteners 130*a* on the first assembly portion 122 and the second assembly portion 134 as shown in FIG. 3E. Then, referring to FIG. 3F, the user can apply force to the display 120, so as to slide the display 120 in relative to the frame 130 along a sliding direction D perpendicular to the pivot axis (i.e., the rotation axis A) between the frame 130 and the main casing 112, and the display 120 can be departed from the frame 130.

Figure 3F:
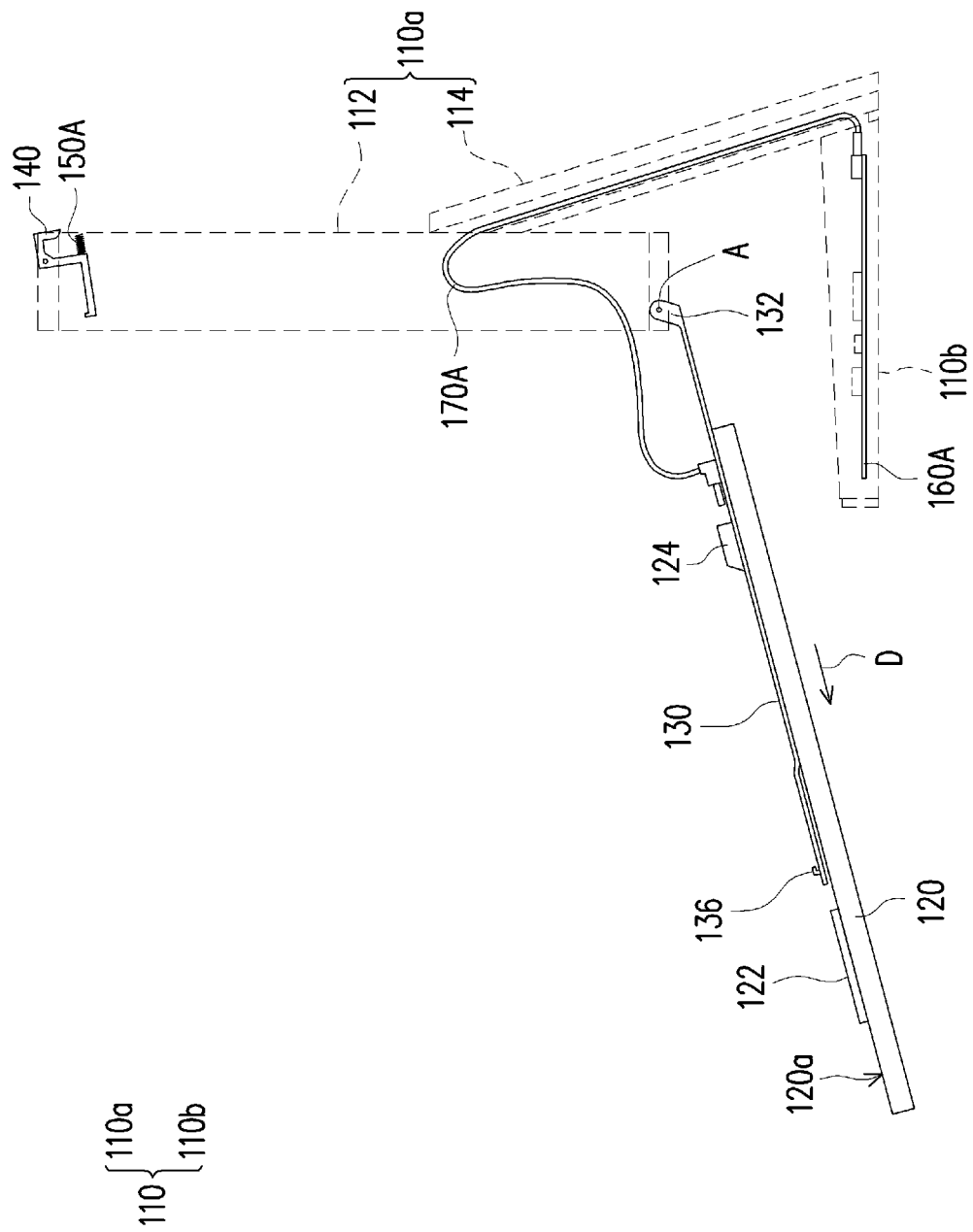

When the user wants to install the repaired display 120 or another display to the main casing 112, the display can be slid in relative to the frame 130 in a direction opposite to the sliding direction D as shown in FIG. 3F to FIG. 3E and mounted to the frame body 130. And then, as shown in FIG. 3E to FIG. 3D, the first assembly portion 122 is fastened to the second assembly portion 134 by the fasteners 130a. Then, the electrical connection cable 170A is plugged into the electrical connection portion 124, and the display 120 is rotated to the first state as shown in FIG. 3D to FIG. 3B. After that, the locking member 140 can engaged with the engaging portion 136 by the elastic force of the elastic component 150A, as shown in FIG. 3A, to accomplish the installation of the display 120.

Referring to FIG. 2, the electronic device 100 of the present embodiment includes at least another electronic assembly 160B (shown as two) and at least one bracket 190 (shown as two). When the display 120 is in the first state shown in FIG. 3A, the brackets 190 is concealed between the display 120 and the main casing 112, and when the display 120 is in the second state shown in FIG. 3D, the bracket 190 is exposed. Two electronic assemblies 160B, for example, the main display card and the auxiliary display card, are installed in the main casing 112 by two brackets 190, respectively. In detail, each electronic assembly 160B has an assembling part M, which is, for example, a metal piece in standard specification disposed on various display cards, and the bracket 190 is a component corresponding to the metal piece in standard specification and installed in the main casing 112. Thus, display cards in various specifications (such as the electronic assemblies 160B) can be detachably mounted to the bracket 190 by its assembling part M in standard specification.

Figure 4:
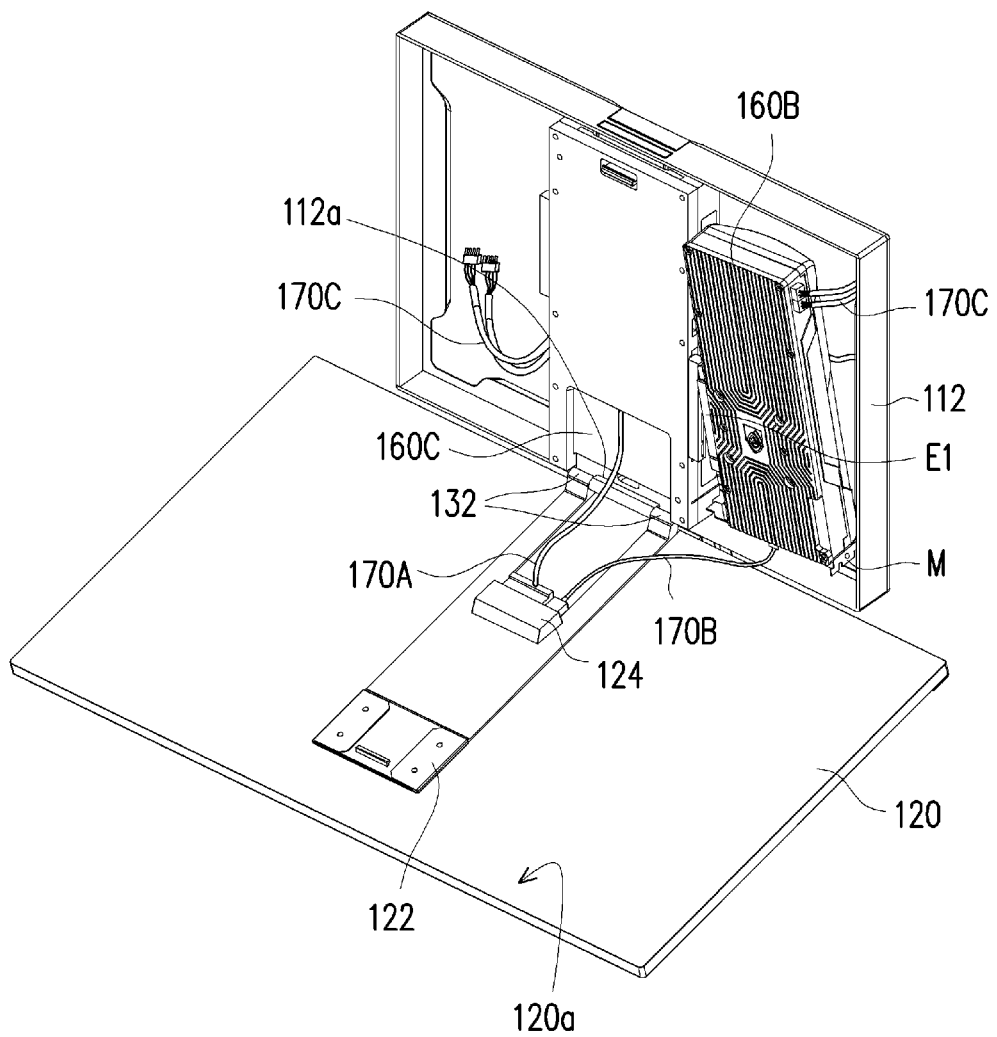
FIG. 4 illustrates the electrical connection of the display and electronic assembly of FIG. 2.

It should be noted that the electrical connection cable 170A shown in FIG. 3A to FIG. 3F is for illustration purposes only, and the electronic device 100 may include more electrical connection cables for power and signal transmission. The following is a detailed description with reference to the drawings. FIG. 4 shows the electrical connection between the display and the electronic assembly of FIG. 2. As shown in FIG. 4, the electrical connection portion 124 is, for example, a signal and power integration slot, and the electrical connection cable 170A plugged into the electrical connection portion 124 is a power cable, which is connected to the second casing part 110b as shown in FIG. 3A. The display 120 receives the required power from external power source connected to the electronic assembly 160A through the electrical connection cable 170A and the electronic assembly 160C. The electronic assembly 160C in the main casing 112 is, for example, a control circuit board of the aforementioned display card (i.e., the electronic assembly 160B), and the electrical connection portion 124 of the display 120 is connected to the electronic assembly 160B through an electrical connection cable 170B. The electronic assembly 160B is plugged into the electronic assembly 160C through a plug terminal E1. The electronic assembly 160C is connected to the electronic assembly 160A in the second casing part 110b through another electrical connection cable 170D shown in FIG. 2. The electrical connection cable 170B and the electrical connection cable 170D are signal cables, so that the display 120 and the electronic assembly 160A transmit signals through the electrical connection cable 170B, the electronic assembly 160B, the electronic assembly 160C, and the electrical connection cable 170D. In addition, the electronic assembly 160B is connected to the electronic assembly 160A in the second casing part 110b through at least one electrical connection cable 170C, and the electrical connection cable 170C is a power cable, so that the electronic assembly 160B can receive the required power from an external power source connected to the electronic assembly 160A through the electrical connection cable 170C.

Figure 5A:
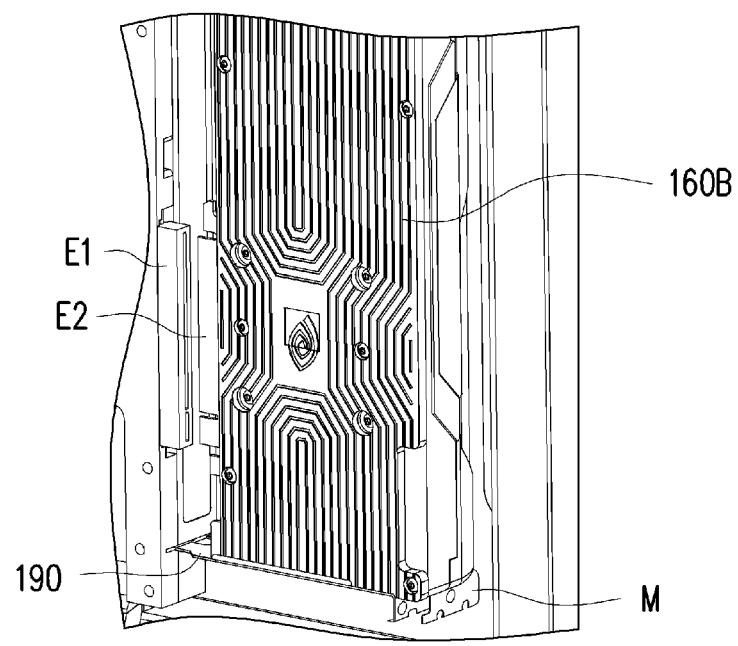
FIG. 5A and FIG. 5B are assembly flowcharts of the electronic assembly of FIG. 4.
Figure 5B:
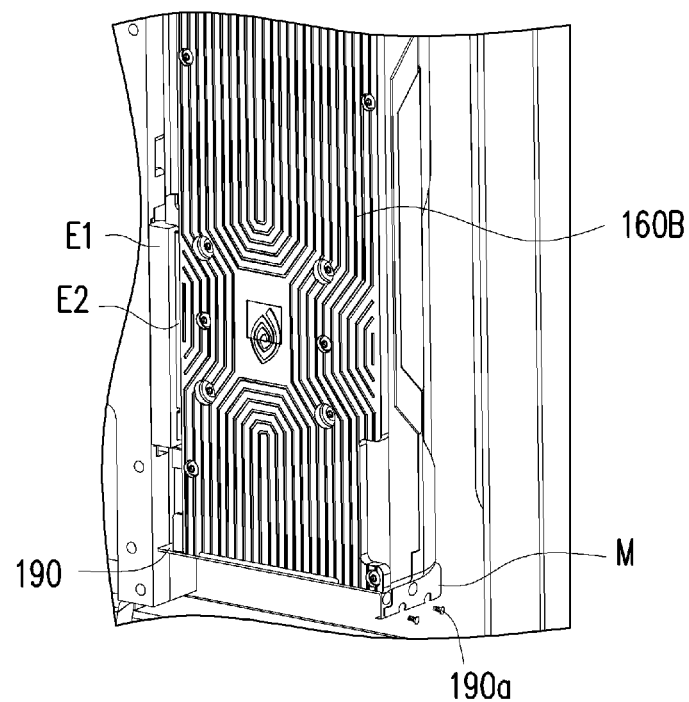

FIG. 5A and FIG. 5B illustrate the assembly process of the electronic assembly of FIG. 4. When the user wishes to assemble the electronic assembly 160B to the main casing 112, the display 120 may be first flipped down from the main casing 112 as shown in FIG. 4 (i.e., the second state shown in FIG. 3D), and the electrical connection cables 170C and electrical connection cables 170B are plugged into the electronic assembly 160B. Then, the assembly part M of the electronic assembly 160B is assembled by sliding the assembly part M along the bracket 190 as shown in FIGS. 5A to 5B, and the assembly part M is fastened to the bracket 190 by fasteners 190a (e.g., screws). In the process, the plug terminal E1 of the electronic assembly 160B is then plugged into the plug terminal E2 of the electronic assembly 160C.

With the above configuration, the display card (the electronic assembly 160B) can be easily detached, allowing the user to configure single or dual display cards as required and facilitate the replacement of the display card. In addition, since the display card (the electronic assembly 160B) and the motherboard (the electronic assembly 160A) are configured in the main casing 112 and the base (the second casing part 110B) respectively, it can avoid the two heat-generating components (the graphics card and the motherboard) getting too close to each other, which increases the difficulty of heat dissipation design.

In FIG. 3A to FIG. 3F, the connection relationship between the electrical connection cable and the electronic assembly 160A is only for illustration. Practically, the electronic assembly 160A has a signal and power integration slot 160A1 as shown in FIG. 2, and the first casing part 110a has an electrical connection portion 114a1 at the extended portion 114a of the stand 114. The electrical connection portion 114a1 is a signal and power integration connector and is suitable for being plugged into the signal and power integration slot 160A1. The electrical connection cable 170A shown in FIG. 3A to FIG. 3F and FIG. 4, the electrical connection cable 170D shown in FIG. 2 and the electrical connection cable 170C shown in FIG. 4 are connected to the electrical connection portion 114a1 shown in FIG. 2, so as to electrically connected to the electronic assembly 160A through the electrical connection portion 114a1 and the signal and power integration slot 160A1.

Figure 6A:
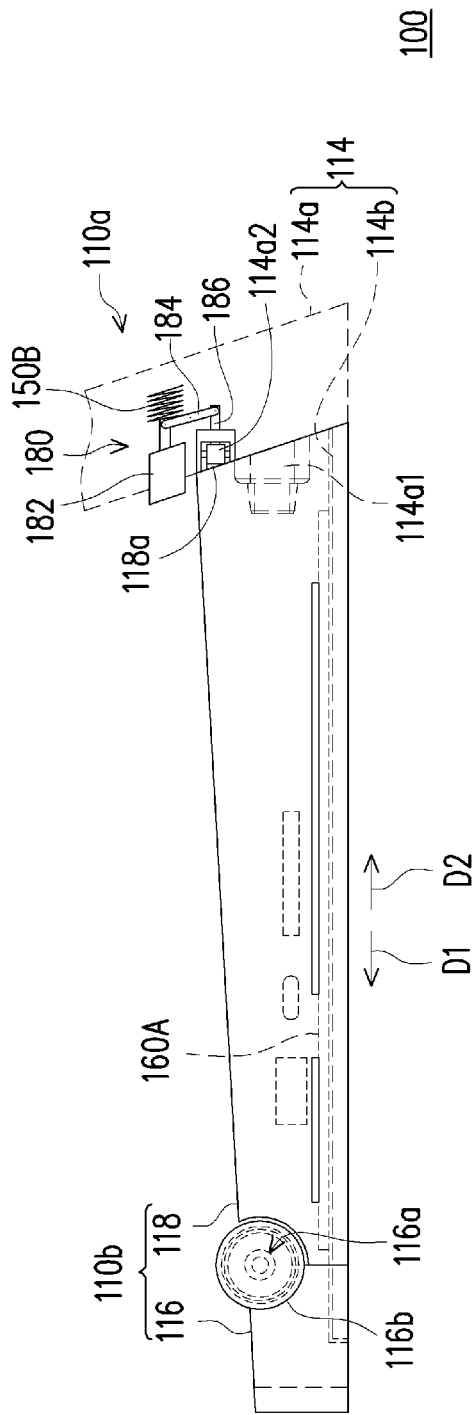
Figure 6B:
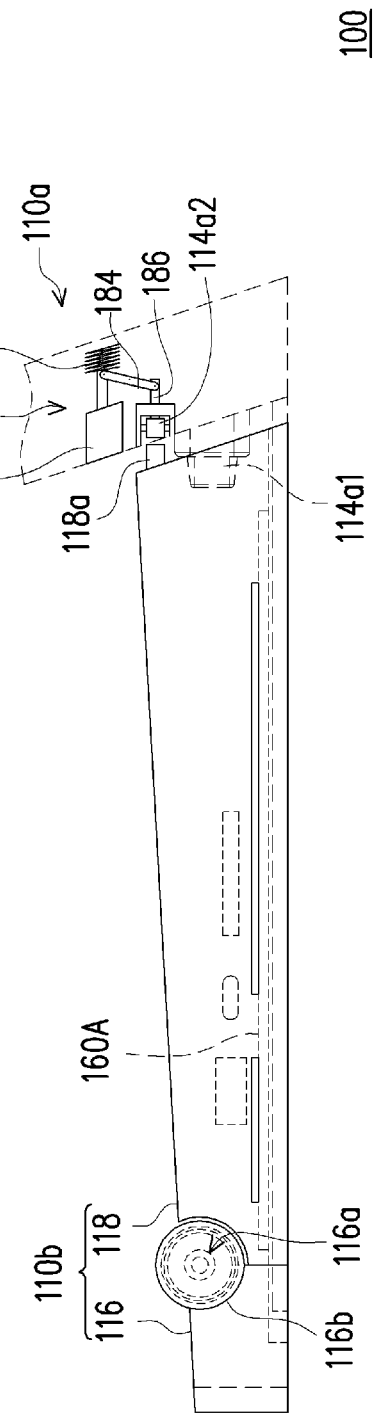
Figure 7:
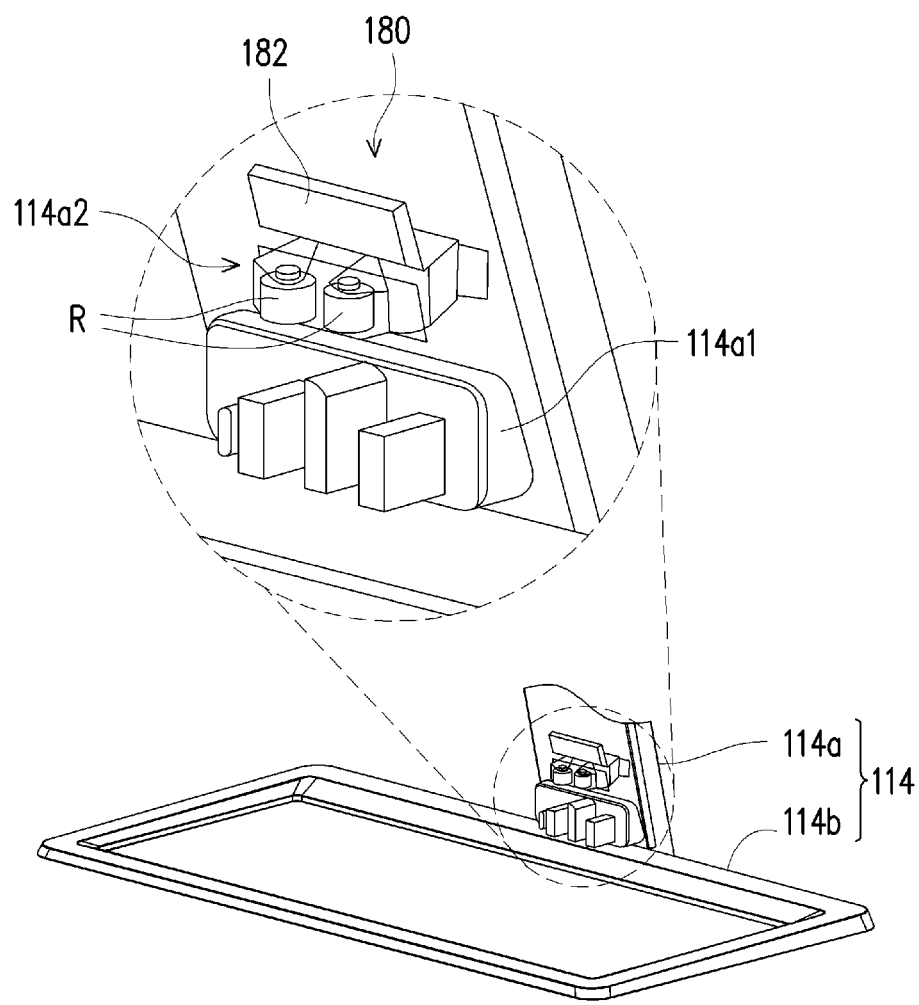
FIG. 7 is a partial perspective view of the stand of FIG. 1.

FIG. 6A to FIG. 6D illustrates the operation process of the second casing part of FIG. 1. FIG. 7 is a partial perspective view of the stand of FIG. 1. Referring to FIG. 6A and FIG. 7, in the present embodiment, the first casing part 110a has an engaging portion 114a2 at the extended portion 114a of the stand 114. The second casing part 110b is movably connected to the first casing part 110a and is configured to move in relative to the first casing part 110a between a first position shown in FIG. 6A and a second position shown in FIG. 6C. When the second casing part 110b is at the first position, the second casing part 110b is engaged with the engaging portion 114a2 of the first casing part 110a and the electronic assembly 160A is connected to the electrical connection portion 114a1 of the first casing part 110a through the signal and power integration slot 160A1. The user can release the engagement between the second casing part 110b and the engaging portion 114a2 as shown in FIG. 6B, and slide the second casing part 110b to the second position as shown in FIG. 6C to disengage the second casing part 110b from the engaging portion 114a2 of the first casing part 110a, and the signal and power integration slot 160A1 of electronic assembly 160A (shown in FIG. 2) is departed from the electrical connection portion 114a1 of first casing part 110a. Then, the user can partially expose the electronic assembly 160A as shown in FIG. 6D for expansion or repair.

With the above configuration, as long as the engagement between the second casing part 110b and the first casing part 110a is released, the second casing part 110b can be moved to a specific position (i.e., the second position), and the electrical connection between the electronic assembly 160A in the second casing part 110b and the electrical connection portion 114a1 of the first casing part 110a is interrupted to improve the convenience of expanding or repairing the electronic assembly 160A.

Specifically, the second casing part 110b is configured to move in a first direction D1 to be disengaged from the first casing part 110a, and the second casing part 110b is configured to be engaged with the engaging portion 114a2 in a second direction D2 opposite to the first direction D1, and the signal and power integration slot 160A1 of the electronic assembly 160A (shown in FIG. 2) is configured to be connected to the electrical connection portion 114a1 along the second direction D2.

Figure 8:
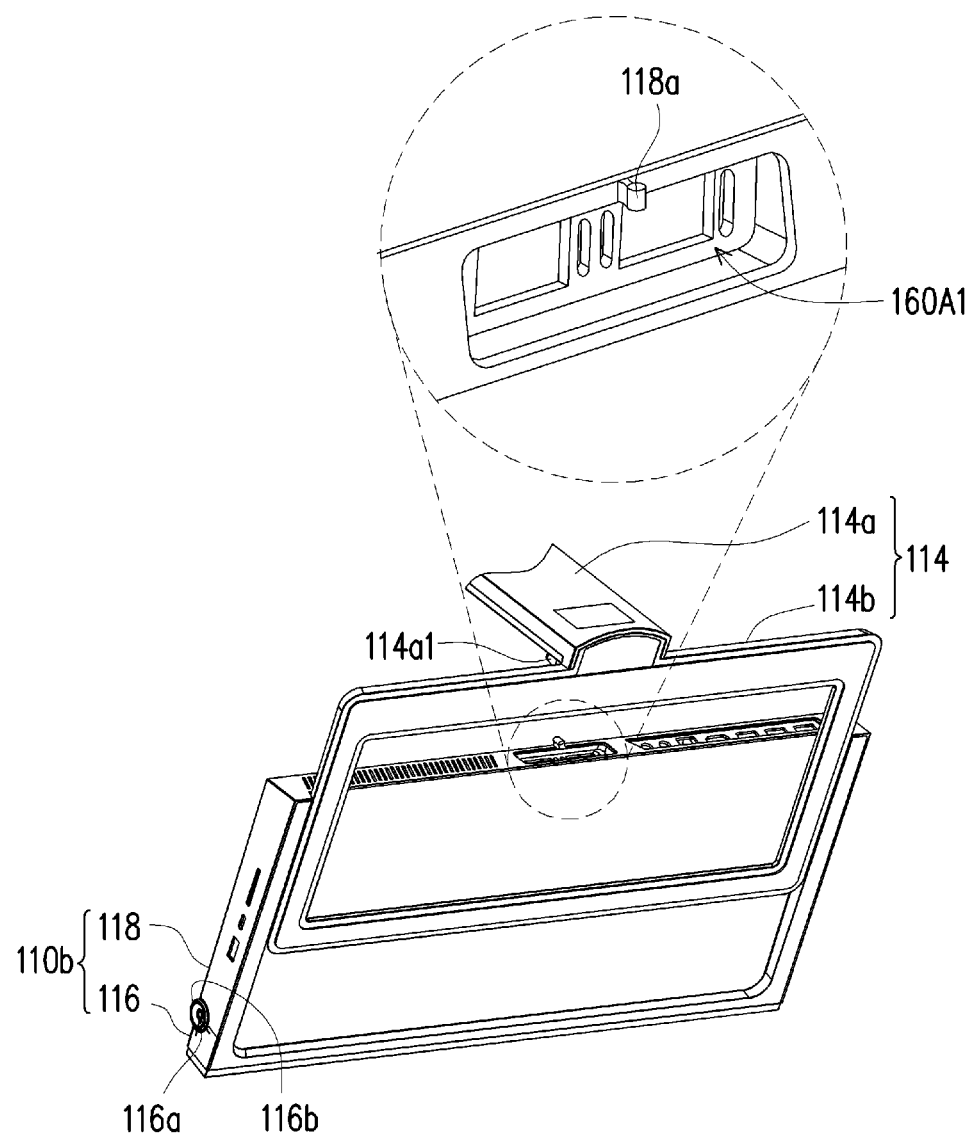
FIG. 8 is a partial perspective view of the electronic device of FIG. 1.

FIG. 8 is a partial perspective view of the electronic device of FIG. 1, which corresponds to the state shown in FIG. 6C. Referring to FIG. 8, the second casing part 110b has a protruding part 118a, and the protruding part 118a is configured to be engaged between the two rollers R of the engaging portion 114a2 shown in FIG. 7. Correspondingly, the electronic device 100 includes a pushing assembly 180, which is movably arranged at the extended portion 114a of the stand 114 of the first casing part 110a and is configured to push the protruding part 118a away from the engaging portion 114a2, as shown in FIG. 6B, to release the engagement between the second casing part 110b and the engaging portion 114a2. Referring to FIG. 6A, in detail, the electronic device 100 further includes an elastic component 150B, the pushing assembly 180 includes a press part 182, a linkage 184, and a push part 186. The linkage 184 is connected between the press part 182 and the push part 186. The elastic component 150B is, for example, a spring and is arranged between the linkage 184 of the pushing assembly 180 and the extended portion 114a of the stand 114. The press part 182 is suitable for being pressed by the user as shown in FIG. 6B and the push part 186 is driven by the linkage 184 against the elastic force of the elastic component 150B to push the protruding part 118a. When the press part 182 is no longer pressed by the user, the pushing assembly 180 is reset by the elastic force of the elastic component 150B as shown in FIG. 6A, FIG. 6C, and FIG. 6D.

In addition, the second casing part 110b of the present embodiment includes a first sub-casing part 116 and a second sub-casing part 118. The second sub-casing part 118 is located between the first sub-casing part 116 and the extended portion 114a of the stand 114. When the second casing part 110b is located at the second position as shown in FIG. 6C, the second sub-casing part 118 is configured to move in the second direction D2 in relative to the first sub-casing part 116 as shown in FIG. 6D, so that an opening area O is formed between the first sub-casing part 116 and the second sub-casing part 118. The opening area O exposes at least a part of the electronic assembly 160A, so that the user can expand or repair the electronic assembly 160A through the opening area O.

In the present embodiment, the first sub-casing part 116 of the second casing part 110b is provided with an audio output jack 116a, which is coupled to the electronic assembly 160A and is used for the audio devices (e.g., various types of speakers). The audio output jack 116a is further provided with a knob 116b, for example, the knob 116b is used to control the audio volume. In other embodiments, the second casing part 110b may be provided with other types of signal input/output devices, which is not limited in the present application.

Figure 9:
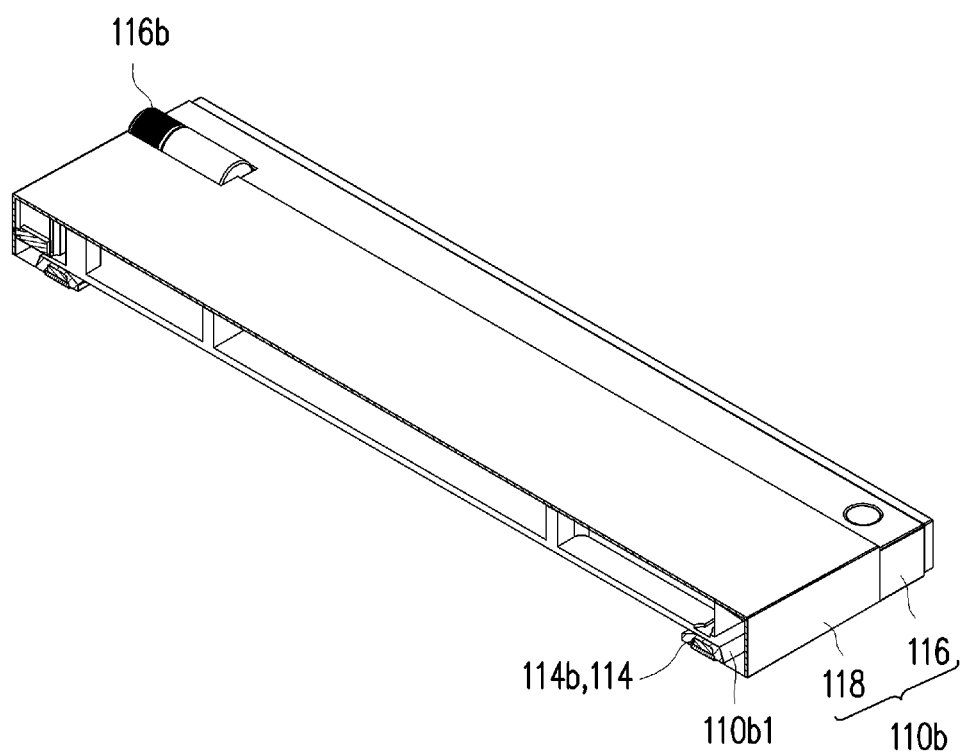
FIG. 9 is a partial perspective view of the second casing part and the stand of FIG. 1 from another perspective.

FIG. 9 is a partial perspective view of the second casing part and the stand of FIG. 1 from another perspective. In the present embodiment, the second casing part 110b has at least one slide rail 110b1 and slides on the based portion 114b of the stand 114 of the first casing part 110a through the slide rail 110b1. In other embodiments, the second casing part 110b can be slid on the first casing part 110a through other applicable manners, which is not limited in the present application.

Accordingly, in the electronic device of the present application, as long as the engagement between the second casing part and the first casing part is released, the second casing part can be moved to a specific position to interrupt the electrical connection between the electronic assembly in the second casing part and the electrical connection portion of the first casing part, to facilitate expansion or repair of the electronic assembly. In addition, the display can be easily disassembled from the main body after being flipped in relative to the main body to a specific state. In this way, the convenience of replacing or repairing the display can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An all-in-one (AIO) computer, comprising: a main body, comprising a first casing part and a second casing part, wherein the second casing part is movably connected to the first casing part and is configured to move between a first position and a second position in relative to the first casing part, the first casing part has an engaging portion and an electrical connection portion; and an electronic assembly, disposed in the second casing part, wherein when the second casing part is located at the first position, the second casing part is engaged with the engaging portion, and the electronic assembly is connected to the electrical connection portion, and when the second casing part is at the second position, the second casing part is departed from the engaging portion, and the electronic assembly is departed from the electrical connection portion; wherein the second casing part is configured to move in a first direction and be departed from the first casing part, the second casing part comprises a first sub-casing part and a second sub-casing part, the second sub-casing part is located between the first sub-casing part and the first casing part, when the second casing part is at the second position, the second sub-casing part is configured to move in a second direction opposite to the first direction in relative to the first sub-casing part, to form an opening area between the first sub-casing part and the second sub-casing part, and the opening area exposes at least a part of the electronic assembly.

2. The AIO computer as claimed in claim 1, wherein the electronic assembly is a motherboard.

3. The AIO computer as claimed in claim 1, wherein the main body comprises a main casing, a base and a stand, and the stand is connected between the base and the main casing to support the main casing on the base, the first casing part includes the main casing and the stand, the engaging portion and the electrical connection portion are located on the stand, and the second casing part is the base.

4. The AIO computer as claimed in claim 1, wherein the second casing part is configured to move in the first direction and be departed from the first casing part, the second casing part is configured to be engaged with the engaging portion along the second direction opposite to the first direction, and the electronic assembly is configured to be connected to the electrical connection portion along the second direction.

5. The AIO computer as claimed in claim 1, wherein the second casing part has a protruding part, the protruding part is configured to be engaged with the engaging portion, and the AIO computer further comprises a pushing assembly which is movably disposed at the first casing part and is configured to push the protruding part away from the engaging portion.

6. The AIO computer as claimed in claim 5, wherein the pushing assembly comprises a press part, a linkage, and a push part, the linkage is connected between the press part and the push part, and the press part is configured to be pressed and drive the pushing part through the linkage to push the protruding part.

7. The AIO computer as claimed in claim 5, further comprising an elastic component, wherein the elastic component is disposed between the pushing assembly and the first casing part, and the pushing assembly is configured to push the protruding part in resisting against an elastic force of the elastic component, and be reset by the elastic force of the elastic component.

8. The AIO computer as claimed in claim 1, wherein the second casing part has at least one slide rail and is slidably arranged on the first casing part through the at least one slide rail.

9. The AIO computer as claimed in claim 1, wherein the electronic assembly has a signal and power integration slot, and the electrical connection portion is a signal and power integration connector, when the second casing part is at the first position, the signal and power integration connector is connected to the signal and power integration slot.

\* \* \* \* \*